United States Patent [19]

Fisk et al.

[11] 3,959,053

[45] May 25, 1976

[54] SURFACE TREATMENT OF TIRES TO REDUCE FLASH

[75] Inventors: George H. Fisk, Munroe Falls; James A. Loulan, Jr., Uniontown, both of Ohio

[73] Assignee: The Goodyear Tire & Rubber Company, Akron, Ohio

[22] Filed: Aug. 5, 1974

[21] Appl. No.: 494,686

[52] U.S. Cl. .............................. 156/123; 156/272; 204/159.2; 204/160.1; 264/22; 264/326
[51] Int. Cl.² ..................... B29C 25/00; B29H 17/00
[58] Field of Search ................ 264/22, 36, 94, 232, 264/236, 315, 326, 340, 347; 156/110 R, 272, 123 R; 204/159.2, 160.1

[56] References Cited
UNITED STATES PATENTS

| 2,763,609 | 9/1956 | Lewis et al. | 264/22 X |
| 2,933,441 | 4/1960 | Mallon | 264/22 UX |
| 3,644,186 | 2/1972 | Cracia et al. | 204/159.2 |
| 3,662,050 | 5/1972 | Willett | 264/102 |
| 3,838,142 | 9/1974 | Hochstein | 264/22 X |

Primary Examiner—Jan H. Silbaugh
Attorney, Agent, or Firm—F. W. Brunner; M. L. Gill

[57] ABSTRACT

A method of reducing rubber projections such as vents and flash formed during molding and vulcanizing of a pneumatic tire by prior treatment of selected outer surfaces of the tire with from one to ten megarads of electron radiation from a 500,000 to 3,000,000 KV source to inhibit the flow of the treated rubbery material into the vent holes of the mold and crevices between abutting sections of the mold.

7 Claims, 4 Drawing Figures

SURFACE TREATMENT OF TIRES TO REDUCE FLASH

The foregoing abstract is not to be taken as limiting the invention of this application and in order to understand the full nature and extent of the technical disclosure of this application reference must be made to the accompanying drawing and the following detailed description.

BACKGROUND OF THE INVENTION

The present invention relates to the shaping and curing of rubber articles and is especially useful in eliminating or effectively reducing flash formed on a pneumatic tire during the molding and vulcanizing process.

Tires are made today by forcing a previously built uncured tire carcass to conform to a mold cavity and then subjecting the tire to heat and pressure to vulcanize the rubber. The mold is comprised of two or more sections, each of which is provided with a number of vent holes which permit gas to escape from the mold cavity during molding and vulcanization of the tire. The rubbery material normally flows into the vent holes and spaces between the abutting mold sections during the shaping and vulcanizing operation causing the formation of unwanted rubber protuberances on the outer molded surface of the tire. The long rubber protuberances or projections formed in the vent holes are commonly referred to as vents. The narrow rubbery ridges formed in the joints of abutting mold sections are commonly referred to as flash. These vents and flash are undesirable from an aesthetic standpoint. Moreover, flash extending across the tread of a tire can generate excessive tread noise during operation. The completed tire is therefore normally moved to a station where any vents or flash are mechanically trimmed from the tire.

SUMMARY OF THE INVENTION

In accordance with the present invention, flash and vents are eliminated or effectively reduced to a tolerable level by the use of electron radiation which is selectively applied to certain of the outer surfaces of the tire prior to the molding and vulcanization of the tire. It was also discovered that the treatment of the road contacting surface of the tire tread by electron radiation also improved the resistance of the tire to skidding under both wet and dry conditions.

Thus, it is an object of the present invention to provide a method of eliminating or effectively reducing the formation of vents or flash on molded rubber articles and more particularly pneumatic tires. Other objects will be in part apparent and in part pointed out more in detail hereinafter.

DETAILED DESCRIPTION OF THE INVENTION

Figure 1:
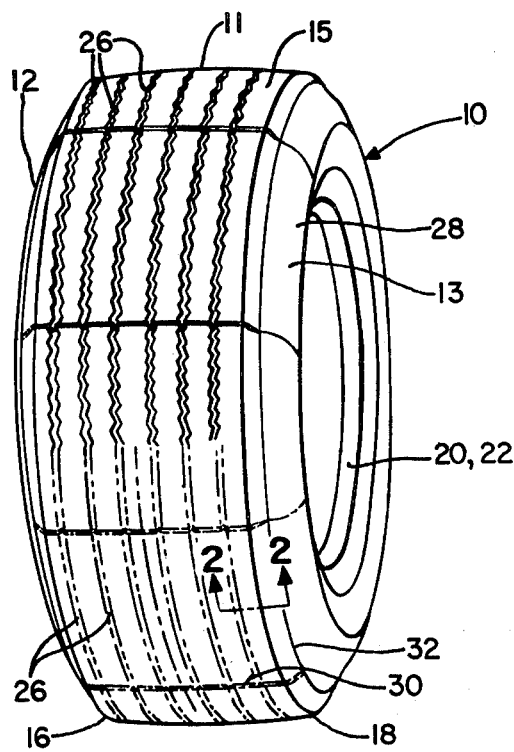
FIG. 1 is a perspective view of a tire made in accordance with the present invention.
Figure 2:
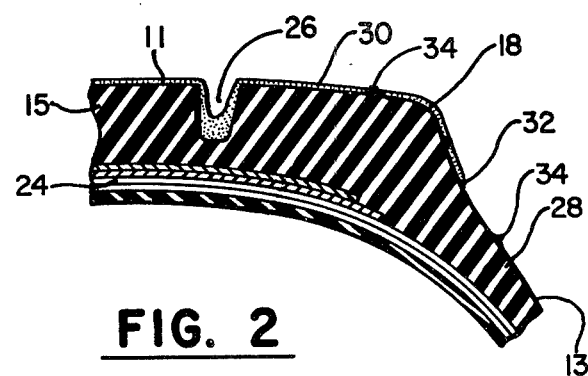
FIG. 2 is a sectional view of a portion of the tire of FIG. 1 taken substantially along line 2—2 of FIG. 1.

With reference to the drawing, and in particular FIGS. 1 and 2, there is illustrated a tire 10 comprising a tread 11, a pair of sidewalls 12 and 13 extending radially inwardly from the lateral edges or shoulders 16 and 18 of the tread and terminating in radially inward directions and annular bead portion 20 and 22. A carcass structure 24 is covered on its radially outer periphery with a suitable tread rubber or elastomeric material 15 and on its axially outer sides by a suitable sidewall covering or layer 28.

The particular tire 10 illustrated is a radial ply tire and was molded and vulcanized in a segmented type mold (not shown) which essentially comprises a pair of sidewall forming sections that are movable axially toward and away from each other to form the sidewalls 12 and 13, and a series of arcuately shaped tread forming segments which are disposed between the sidewall forming sections and movable radially inwardly toward the tire to form the tread pattern. The pair of sidewall forming sections and series of arcuately shaped tread forming segments provide the mold cavity for shaping and curing the tire.

This specific mold is particularly susceptible to the forming of transversely or axially extending flash 30 across the tread portion 11 of the tire in the joints between the abutting arcuate segments. Additional flash 32 may be formed at the juncture between each sidewall section of the mold and a series of arcuately shaped tread forming sections.

Figure 3:
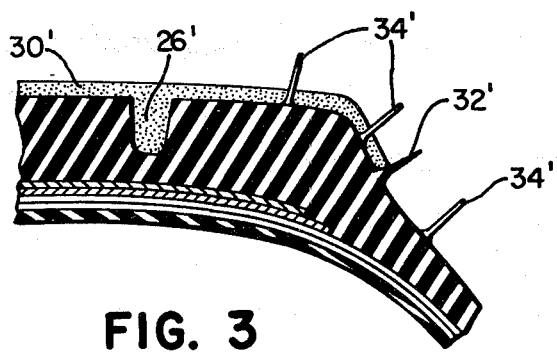
FIG. 3 is a sectional view similar to that of FIG. 2 but of a tire made according to a prior art technique.

With reference to FIG. 3, previously known techniques for shaping and curing tires in such segmented molds has resulted in the flash 30' providing a continuous barrier across any circumferentially extending grooves 26' which results in circumferentially extending air pockets in the tread portion. These pockets tend to produce unwanted noise during the operation of the tire on the road. It, therefore, is desirable to eliminate the continuity of the flash 30' across the circumferentially extending grooves 26'.

Further with reference to FIG. 3 and as noted above, rubber tends to flow into the air vents in the mold and form elongated round projections or protuberances 34' on the tire surface. These projections or protuberances are generally undesirable from a visual aesthetics standpoint and are normally removed by an additional manufacturing operation in which they are cut from the surface of the tire. It again would be desirable to eliminate these protuberances.

Figure 4:
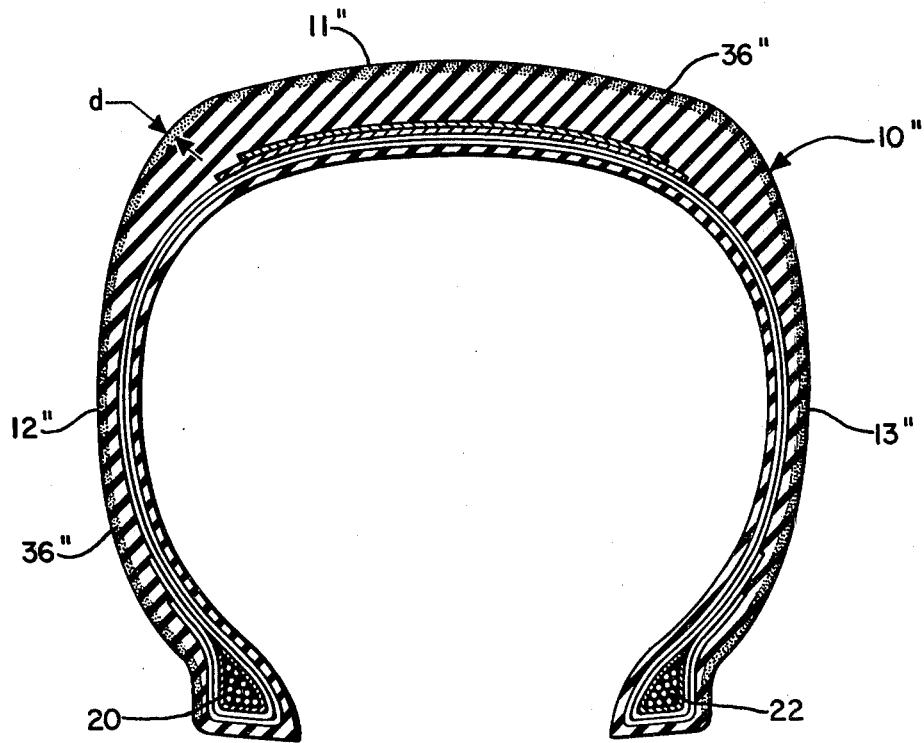
FIG. 4 is a cross-sectional view of the tire of FIG. 1 taken after the tire has been built shaped to the form of a torus but prior to shaping and curing in a mold.

In the normal building operation of a pneumatic tire the various components are assembled on a tire building and shaping drum. This operation may include building the tire completely in a cylindrical form or partially building the tire in a cylindrical form and then expanding the tire to a generally torus form followed by the application of a belt or breaker structure and tread rubber. For purposes of describing the invention an uncured tire 10'' which has been shaped to the form of a torus is illustrated in FIG. 4. In accordance with the present invention, the surface of those portions of the tire 10'' at which there is a desire to eliminate or reduce the vent or flash are treated with a critical dosage of electron radiation. This dosage is selected to provide a sufficient penetration of the rubber and a degree of cure on the outer surface of the rubber to prevent flow of the rubber into the cracks or juncture between the sections of the mold or into the vent holes of the mold.

It is important, however, that the dosage of radiation treatment is not too large such that the rubber will not flow completely into the matrix of the mold and result in void portions in the tread or sidewall pattern. Thus, the amount of dosage of electron radiation is critical to the complete formation of the desired tread and sidewall pattern without the production of unwanted flash or vents. It has been found that a dosage of electron radiation between one and ten megarads are suitable for most applications. The preferred dosage is between three and six megarads. The radiation source should be between 500,000 KV and 3,000,000 KV in order to obtain the proper penetration.

If these parameters are followed there will be effective carbon-carbon cross linking of polymer chains to a depth $d$ of between about 0.02 inch and about 0.45 inch. For purposes of the present invention effective carbon-carbon cross linking is obtained if the amount of carbon-carbon cross linking is equal to at least 50 percent of the maximum carbon-carbon cross linking in the layer. Thus a tire treated by a 500,000 to 3,000,000 KV radiation source in the area of the tread 11'' and the sidewalls 12'' and 13'' has a surface layer 36'' between 0.02 and 0.45 inch thick which contains an effective amount of carbon-carbon cross linked polymer chains.

This tire, before it is placed in the mold and heat cured, does not have any significant amount of carbon-sulfur-carbon cross linked polymer chains and thus will not be susceptible to overcure due to the prior radiation treatment. By being free of any significant amount of carbon-sulfur-carbon cross linked polymer chains it is meant that the rubber has not been subjected to heat cure and the only such carbon-sulfur-carbon cross linked polymer chains that exist are those caused by passage of time in ambient conditions in the tire plant.

A comparison of FIG. 2 graphically illustrates the advantages obtained by exposing certain areas of the tire to the critical dose of electron radiation specified above. Most of the crosswise flash 30 resulting from conventionally molding and curing a tire as seen in FIG. 3 is eliminated. The grooves 26 of the tread are, therefore, not completely blocked by the crosswise flash and thereby eliminating the noise pockets and thus reducing the noise level during operation of the tire.

Also with reference to FIGS. 2 and 3, the vents 34' are reduced to the size of small nodes 34 which are hardly noticeable and certainly not unsightly.

It was also discovered that the tires treated in accordance with the present invention exhibited increased resistance to treadwear and an improvement in resistance to skidding under both wet and dry conditions. The unexpected improvement in wet and dry skid resistance may be due to the fact that the electron radiation treatment produces a carbon-carbon cross linking of polymer chains along the tread surface and down the sidewalls of the grooves. Tests on a series of tires has shown an improvement in traction of from 2 percent to 9 percent depending on the speed of the vehicle and the conditions of the roadway.

It will be appreciated that the surface of the tread rubber could be subjected to electron radiation treatment either before or after it is assembled on the tire building drum but in any event, prior to being made to conform to the shaping and curing mold. Further, other areas of the tire such as the sidewall and bead regions could be subjected to electron radiation treatment to avoid vents and flash. Also, as is normal procedure in measuring dosages of radiation treatment, the dosage is measured on the surface of the material on the side facing the electron accelerator.

While certain representative embodiments and details have been shown for the purpose of illustrating the invention, it will be apparent to those skilled in this art that various changes and modifications may be made therein without departing from the spirit or scope of the invention.

What is claimed is:

1. A method of manufacturing a rubber or rubberized article in which the article is preformed of a material including unvulcanized elastomeric material and subsequently made to conform to a mold having at least two sections with vent holes and vulcanized, the improvement comprising; subjecting selected portions of the outer surface of the preformed article prior to the vulcanization of the elastomeric material to a dosage of electron radiation between one and ten megarads from a source having an intensity of between 500,000 and 3,000,000 KV which is sufficient to at least inhibit the flow of the elastomeric material into vent holes and parting lines between sections of the mold, but insufficient to prevent complete conformance of the preform to the mold cavity.

2. A method as claimed in claim 1 wherein the dosage of electron radiation is between three and six megarads.

3. A method of manufacturing a pneumatic tire in which various components of the tire, including vulcanized elastomeric material, are assembled on a form, and the assembled components are confined in and conformed to a mold comprising at least two sections with vent holes and cured under heat and pressure, the improvement comprising, subjecting selected portions of the outer surface of the unvulcanized elastomeric material, prior to the vulcanization of the tire, to a dosage of electron radiation between one and ten megarads from a source having an intensity of between 500,000 and 3,000,000 KV which is sufficient to at least inhibit the flow of the elastomeric material into vent holes and small crevices between abutting sections of the mold but insufficient to prevent the flow of material into conformance with all portions of a molding pattern of the mold.

4. A method as claimed in claim 3 wherein the dosage of electron radiation is between three and six megarads.

5. A method as claimed in claim 3 in which the tire is cured in a segmented mold, and a portion of the outer surface of the material forming at least the tread of the tire is subjected to electron radiation treatment.

6. A method as claimed in claim 5 wherein the outer surface of the elastomeric material forming the sidewalls of the tire is subjected to electron radiation prior to its assembly on the form.

7. A method as claimed in claim 6 wherein the dosage of electron radiation is between three and six megarads.

* * * * *

UNITED STATES PATENT OFFICE
CERTIFICATE OF CORRECTION

PATENT NO. : 3,959,053
DATED : May 25, 1976
INVENTOR(S) : George H. Fisk and James A. Loulan, Jr.

It is certified that error appears in the above-identified patent and that said Letters Patent are hereby corrected as shown below:

Claim 3, line 35, "vulcanized" should read -- unvulcanized --.

Signed and Sealed this

Fourteenth Day of September 1976

[SEAL]

Attest:

RUTH C. MASON
Attesting Officer

C. MARSHALL DANN
Commissioner of Patents and Trademarks